US009603381B2

(12) United States Patent
Mesu

(10) Patent No.: US 9,603,381 B2
(45) Date of Patent: Mar. 28, 2017

(54) CEREAL BAR HAVING A CRUNCHY TEXTURE

(75) Inventor: Gurbe Jelle Mesu, Aw Zaltbommel (NL)

(73) Assignee: The Quaker Oats Company, Chicago, IL (US)

( * ) Notice: Subject to any disclaimer, the term of this patent is extended or adjusted under 35 U.S.C. 154(b) by 1083 days.

(21) Appl. No.: 12/517,307

(22) PCT Filed: Dec. 3, 2007

(86) PCT No.: PCT/US2007/086267
§ 371 (c)(1),
(2), (4) Date: Feb. 17, 2010

(87) PCT Pub. No.: WO2008/070617
PCT Pub. Date: Jun. 12, 2008

(65) Prior Publication Data
US 2010/0143569 A1    Jun. 10, 2010

Related U.S. Application Data

(60) Provisional application No. 60/868,428, filed on Dec. 4, 2006.

(51) Int. Cl.
A23L 1/164    (2006.01)
A23L 7/126    (2016.01)

(52) U.S. Cl.
CPC .................................. A23L 7/126 (2016.08)

(58) Field of Classification Search
CPC ........................................... A23L 7/126
USPC ...................... 426/618, 619, 620
See application file for complete search history.

(56) References Cited

U.S. PATENT DOCUMENTS

| | | | |
|---|---|---|---|
| 3,432,112 A | 3/1969 | Durst | |
| 3,903,308 A | 9/1975 | Ode | |
| 4,451,488 A | 5/1984 | Cook et al. | |
| 4,689,238 A | 8/1987 | Hitchner | |
| 4,832,971 A | 5/1989 | Michnowski | |
| 4,859,475 A | 8/1989 | Michnowski | |
| 4,871,557 A | 10/1989 | Linscott | |
| 5,091,201 A * | 2/1992 | Murata et al. | 426/285 |
| 5,817,355 A | 10/1998 | Zukerman et al. | |
| 5,902,630 A | 5/1999 | Imai | |
| 6,303,163 B1 | 10/2001 | Wu | |
| 6,375,998 B1 | 4/2002 | Wu | |
| 6,592,915 B1 * | 7/2003 | Froseth et al. | 426/93 |
| 6,638,557 B2 | 10/2003 | Qi et al. | |
| 6,676,982 B2 | 1/2004 | Mody | |
| 6,821,537 B2 | 11/2004 | Wu | |
| 7,037,551 B2 | 5/2006 | Moore et al. | |
| 7,118,774 B2 | 10/2006 | Coleman et al. | |
| 7,763,298 B2 * | 7/2010 | Archibald et al. | 426/414 |
| 8,110,231 B2 * | 2/2012 | Coleman et al. | 426/96 |
| 8,551,544 B2 * | 10/2013 | Borders et al. | 426/89 |
| 2005/0002989 A1 | 1/2005 | Palmer et al. | |

FOREIGN PATENT DOCUMENTS

| | | |
|---|---|---|
| CA | 2583897 A1 | 10/2007 |
| EP | 0306773 A | 3/1989 |
| EP | 1435204 A | 7/2004 |
| EP | 1435204 A2 | 7/2004 |
| EP | 1698238 A | 9/2006 |
| EP | 1698238 A1 | 9/2006 |
| WO | 0122835 A | 4/2001 |
| WO | 0122835 A1 | 4/2001 |
| WO | 0164044 A2 | 9/2001 |
| WO | 0221937 A | 3/2002 |
| WO | 0221937 A2 | 3/2002 |

OTHER PUBLICATIONS

Office Action issued Aug. 2, 2011 in related Canadian Application No. 2671616.
International Search Report for PCT/US2007/086267 (WO2008/070617 A1) Issued May 3, 2008.
European Search Report, date of completion of Jul. 5, 2012, issued in the corresponding EP application 12166645.
Office Action issued Mar. 21, 2012 in related Canadian Application No. 2671616.

* cited by examiner

*Primary Examiner* — Lien T Tran
(74) *Attorney, Agent, or Firm* — James R. Gourley; Colin P. Cahoon; Carstens & Cahoon, LLP

(57) ABSTRACT

Disclosed is a cereal bar having as a binder an aqueous solution of starch, another (poly)saccharide, or protein solution wherein the cereal bar has a crunchy texture. Also disclosed is a method of producing a cereal bar is provided in which the cereal comprises a cereal mixture including ready-to-eat (RTE) cereal pieces joined together with a binder, where the cereal and binder together form a cereal matrix which is heated for a time and temperature to reduce the water activity of the external portion thereof while maintaining an internal portion of the cereal matrix at a higher second water activity. The method provides cereal bars requiring less compressive force to be formed into a cohesive self-supporting structure in providing a chewy reduced-density cereal bar with improved shelf life.

28 Claims, No Drawings

CEREAL BAR HAVING A CRUNCHY TEXTURE

FIELD OF THE INVENTION

This invention relates to a cereal bar having a crunchy texture. In particular, this invention relates to cereal bars, or other formed pieces of cereal, having as a binder an aqueous solution comprising starch, other (poly)saccharides, or protein solution.

BACKGROUND OF THE INVENTION

Hand-held cereal bars are known in the art. A cereal bar provides a portable, conveniently packaged, immediately available meal or snack. However, to date, it has proven difficult to provide a nutritious product without sacrificing taste and flavor. Also, a commercially successful cereal bar should have a long shelf life and have a consistent flavor and texture during that shelf life.

Cereal bars typically comprise particles bound together with a mixture of sugar syrup and fat or with another binder as a matrix. The particles typically are cereals and grains, together with inclusions or additions. Inclusions and additions are selected from items such as fruit, nuts, and other bits such as chocolate bits and marshmallow bits.

Binders are a source of difficulty in bar formulations. Typically, binders comprise sugar syrup and fat. Such binders yield a cereal bar that is likely to be sticky and sweet, and which hardens over time. Many consumers do not prefer an excessively sweet flavor. Similarly, a sticky product is not favored by consumers seeking to enjoy a neat meal or snack. Whereas addition of fat may harden the binder and reduce stickiness, fat adds calories without adding to nutritional value.

Another potential coating source is confectionary coatings, such as granulated sugar and chocolate- and cocoa-based coatings. However, granulated sugar is not a good binder, and chocolate-based coatings tend to melt. Further, such binders tend to change the flavor of the bar to sweet, or to completely mask the flavors of the particles with the flavor of the coating.

Binders also tend to affect the texture of the cereal bar. Sticky binders cause the particles of the end product to stick together yielding a sticky matrix in the end product, thus reducing crunchiness. Fats in the binder may provide a mouthfeel incompatible with the crispness or crunchiness of the particles. Such a mouthfeel may not be acceptable to many consumers.

In an attempt to provide a cereal bar with a crisp texture, binder systems have been proposed. Such binder systems require two-component, two-texture binders to achieve the desired taste and texture. The first binder is a crisp material comprising whipped protein foam in aqueous solution form and a protein foam stabilizer. The second binder is a chewy binder comprising a gelled solution of gelatin in glycerol. The binders are used in combination. This binder combination requires additional processing and yields an ambiguous texture that is not crunchy.

Thus, there exists a need for a nutritious cereal bar that meets all these needs. In particular, there exists a need for an easily manufactured, nutritious cereal bar that has a crunchy texture and does not include a sweet or sticky binder.

BRIEF SUMMARY OF THE INVENTION

A first embodiment of the invention is directed to a cereal bar with a crunchy texture.

A second embodiment of the invention is directed to an easily manufactured, nutritious cereal bar having a binder that provides a crunchy texture without being undesirably sticky and without adding unwanted sweetness. Crunchy texture is a result of using crunchy ingredients in combination with a binder that does not interfere with the texture of the bar. When water of the binder solution is evaporated by drying, a crunchy texture is obtained in the end product.

DETAILED DESCRIPTION OF THE INVENTION

Embodiments of the invention are directed to a cereal bar with a crunchy texture. This texture is provided by a binder that is neither sweet nor sticky in the end product. The cereal bar comprises particulate dry ingredients bound together with an aqueous solution comprising starch, other (poly) saccharides or protein. The particulate material is blended with the aqueous solution, then dried at low temperature for a short period, to form a cereal bar. The nutritional value of the cereal bar is not adversely affected by addition of sugars and fats in the binder. The resultant cereal bar will appeal to a consumer who wants a nutritious bar with a crunchy texture, rather than a sticky texture, and with a natural, not excessively sweetened, taste.

The cereal bar provides a drier, grainy, natural appearance, and is like granola in texture. The taste and texture of the particulates in the cereal bar can be adjusted to suit consumer preference. The binder makes little or no contribution to taste.

The particulate dry ingredients are selected from cereals, grains, and additions and inclusions. Cereals and grains that are part of the particulate dry ingredients are selected from those typically found in cereal bars. These cereals and grains are toasted, baked, or otherwise processed so that the cereal bar need not be baked. Cereals and grains are selected from rice, wheat, corn, barley, rye, oats, sorghum, millet, amaranth, kamut, and other cereals and grains. The identities of and relative proportions of the cereals and grains are selected to provide the desired texture and flavor. Rice can be in the form of crispy rice, also known as toasted puffed rice, or can be toasted rice extrudate. Both forms are known to skilled practitioners. Similarly, corn can be in the form of flakes, toasted puffs, or popped corn. The other cereals and grains can be processed in manners known in the art. Skilled practitioners are familiar with the various toasted, baked, and processed cereals and grains that can form part of the particulate dry ingredients of a cereal bar.

Prepared agglomerates, such as granola or crispy muesli, also may form part of the particulate ingredients. Such products typically comprise oats (whether steel cut, rolled, or otherwise processed), wheat, sugar, and oil. Granolas and crispy muesli also may include other ingredients known to skilled practitioners. Such products add to the crunchy texture of the cereal bar.

Inclusions or additions also can be added to the particulate dry ingredients. Such inclusions include dried fruit pieces, processed fruit pieces, nut pieces, confectionary bits such as chocolate pieces, and other additions known to skilled practitioners. Processed fruit pieces may be in the form of agglomerates that comprise additional ingredients, such as sugars, pectins, or other gelatinizing agents. Dried fruit pieces include pieces of raspberry, cranberry, raisin, apple, pear, pineapple, and other fruits. Nut pieces include pecans, peanuts, hazel nuts, almonds, walnuts, and other nuts known to skilled practitioners.

The size of the dry particulate ingredients is limited only by the ability to process the materials and the texture of the cereal bar. Some cereals and grains, such as millet, naturally are relatively small. Others, such as oats, are processed by rolling or are steel cut to smaller sizes. Tougher particles may preferably be cut into smaller sizes. By-products of other processes also can be suitable. For example, undersized pieces and fines from another cereal processing stream also may be suitable. One example of such a stream is the fines and broken pieces from production of corn flakes. The skilled practitioner recognizes how to select appropriate particle size for various cereals and grains.

The size of any nut pieces present is dependent upon the desired taste and texture of the cereal bar. For example, the nut pieces typically are fractions of whole nuts, such as one-eighth, one-quarter, or one-half of a nut. The size of the nut pieces impacts both economics and the texture of the cereal bar. Typically, the larger the nut pieces, the more expensive the pieces will be. Also, a smaller nut piece may provide more of a chewy texture, whereas a larger nut piece may provide more of a crunchy texture. Thus, with the guidance provided herein, the skilled practitioner can determine the appropriate size for nut pieces.

Similar considerations apply to the selection of the size of the dried fruit pieces. For example, the pieces must be large enough to be perceived by the consumer as a fruit piece, but cannot be so large as to make processing difficult. Here, again, the skilled practitioner can determine the appropriate size for dried fruit pieces.

The binder solution is an aqueous solution comprising binder selected from the group consisting of starch, other (poly)saccharides, or of protein, and blends thereof. The starch source of the protein source, or the (poly)saccharide source is selected from edible starches, other (poly)saccharides, or proteins, that in solution yield a sticky solution that will bind the dry particles sufficiently to process the mixed materials to form pieces or bars, and when dry, bind the dry particles without interfering with the flavor or texture of the dry ingredients. The result is an easily manufactured, crunchy end product. Starch is selected from the edible starches, particularly purified native potato starch. Protein is selected from proteins that form solutions, such as high-gelling, ultra-filtered whey protein. Other (poly)saccharides are selected from low DE syrups, such as low DE glucose syrup, and oligofructose syrup. Glucose syrups having a DE in the range of between about 25 and about 50, and typically between about 25 and about 30, are suitable. Such syrups provide sufficient binding ability without interfering with the flavor or texture of the dry ingredients.

The amount of starch, other (poly)saccharides, or protein in water is selected to be high enough to provide effective binding of the dry particulate ingredients, but not sufficiently high as to interfere with the flavor or texture of the end product or to present an unattractive appearance. The amount of potato starch typically required to provide the necessary binding effect is between about 0.5 and about 1.5 wt percent, based on the weight of the dried cereal bar, and typically is between about 0.6 and about 1.3 wt percent, more typically between about 0.60 and about 0.90 wt percent. The amount of other (poly)saccharides typically required to provide the necessary binding effect is between about 8 and about 15 wt percent, based on the weight of the dry cereal bar, and typically is between about 10 and about 14 wt percent. The amount of protein typically required to provide the necessary binding effect is between about 2 and about 3 wt percent, based on the weight of the dried cereal bar, and typically is between about 2.2 and about 2.9 of wt percent.

The concentration of potato starch in water typically is between about 4 and about 10 wt percent, based on the weight of the solution, more typically between about 3.5 and about 9 wt percent, and even more typically between about 3 and about 7 wt percent. If the concentration of potato starch is too low, longer drying time is required. If the concentration of potato starch is too high, the binder becomes too thick to handle.

The concentration of other (poly)saccharides in water is between about 60 and about 80 wt percent, based on the weight of the solution, more typically between about 65 and about 75 wt percent.

The concentration of whey protein in water typically is between about 20 and about 30 wt percent, based on the weight of the solution, more typically between about 22 and about 28 wt percent. If the concentration of protein is too low, the binding will not be sufficient. If the concentration of protein is too high, the binder becomes too thick to handle.

With the guidance provided herein, the skilled practitioner will be able to prepare an aqueous starch, (poly)saccharide or protein solution of appropriate concentration and will be able to determine the amount of such solution to be used to yield a cereal bar having the desired taste and texture. As the skilled practitioner recognizes, blends of these binders likely would be suitable when utilized in concentrations approximately proportionate to the relative proportion of each binder in the combination.

The proportion of dry particulate ingredients to binder is selected to provide a cereal bar that is crunchy and like granola in texture. The skilled practitioner recognizes that the binder is intended to hold the product together and enable cutting of a sheet of material into individual pieces, such as before it is baked, and to provide the desired texture after baking. Too much binder may yield a cereal bar with undesirably hard texture, or may yield individual unbaked pieces that do not hold their shape when cut from a larger sheet. Too little binder may yield a cereal bar that may not hold its shape at any time.

Thus, the weight ratio of dry particulate ingredients to binder is any ratio that will form a mixture sufficiently coherent to process when wet and to yield crunchy, coherent product when dry. Typically, the weight ratio of dry particulates to binder solution is between about 95:5 to about 75:25.

Flavors, colors, and other minor components also may be added to both the dry particulate ingredients and the binder solution. For example, flavors may be added to enhance or complement fruits or nuts already present, or simply as the sole flavor component. Not only may fruit and nut flavors be added, but also herbs and spices such as cinnamon, cloves, nutmeg, and the like may be used. Maple and other flavors also can be added. Suitable flavors are known to skilled practitioners. Any minor components can be added to either the dry particulate ingredients or the aqueous binder solution. The skilled practitioner recognizes that it may be preferable to add ingredients that are not water soluble to the dry ingredients.

In certain embodiments, cereal bars are made by forming a blend of dry particulate ingredients and separately forming an aqueous solution of binder, and preferably potato starch or protein, of desired concentration. The dry ingredients are mixed with the aqueous binder solution, and the mixture is formed into a sheet. The sheet is formed to have the desired thickness, typically by evenly spreading mixed product on a belt, followed by rolling and shaping.

Skilled practitioners recognize that individual pieces can be formed before or after drying. The sheet can be cut, punched, or otherwise formed into pieces of the desired shape and size. Similarly, the sheet can be cut into strips. The mixture then is dried, cut or punched as necessary to form individual pieces, then cooled and packed. Pieces cut after drying typically are cut before cooling.

Because the dry particulate material may be toasted, baked, or otherwise processed before mixing, it is necessary only to dry the sheeted mixture. Drying conveniently is carried out at a temperature above 100° C. for a time sufficient to achieve adequate dryness. The skilled practitioner recognizes that the time required is related to the temperature and the amount of moisture present in the dry particulate ingredients and the aqueous binder solution. Typically, at a temperature between about 110° C. and about 150° C., between about 10 and about 60 minutes and more typically between about 20 and about 50 minutes, drying time is required. With this guidance, skilled practitioners will be able to determine an appropriate drying time.

EXAMPLES

Example 1

Cereal bars were made by blending dry particulate ingredients and separately forming an aqueous solution of 5 wt percent potato starch based on the weight of the solution. The dry particulate ingredients are identified in the table below. The percentages are based on the total mixture of dry particulate ingredients and aqueous potato starch solution.

The blend of dry particulate ingredients and the aqueous starch solution were mixed to form a mixture. The mixture was sheeted to form a sheet 10 mm thick. The sheet was cut longitudinally to form strips 40 mm wide.

The thus-formed strips were dried at the temperatures and for the times listed in the table below. The dried strips then were cross-cut to form individual pieces of cereal bar measuring 40 mm by 40 mm by 10 mm thick.

The resultant cereal bars had desired taste, and were dry, grainy, natural in appearance, and like granola in texture.

TABLE 1

| | Cereal bar type | | | | |
|---|---|---|---|---|---|
| | Fruit | Cranberry | Nut | Fruit and Nut | Apple Raisin |
| Granola | 59.6 | 59.6 | 58.4 | 56.2 | 57.1 |
| Whole grain rolled oats | 15.7 | 15.7 | 15.4 | 14.8 | 15.0 |
| Crisp Rice Extrusion, wt % | 3.1 | 3.1 | 3.1 | 3.0 | 3.0 |
| Dried raspberry pieces, wt % | 3.7 | 0 | 0 | 0 | 0 |
| Dried strawberry pieces, wt % | 3.7 | 0 | 0 | 0 | 0 |
| Strawberry flavor, wt % | 0.3 | 0 | 0 | 0 | 0 |
| Dried cranberry pieces, wt % | 0 | 7.4 | 0 | 0 | 0 |
| Cranberry flavor, wt % | 0 | 0.3 | 0 | 0 | 0 |
| Pecan (1/8) pieces, wt % | 0 | 0 | 4.7 | 7.0 | 0 |
| Hazelnut (1/2) pieces, wt % | 0 | 0 | 4.7 | 0 | 0 |
| Hazelnut flavor, wt % | 0 | 0 | 0.3 | 0 | 0 |
| Dried white fruit pieces, wt % | 0 | 0 | 0 | 4.9 | 0 |
| Pecan flavor, wt % | 0 | 0 | 0 | 0.3 | 0 |
| Dried apple pieces, wt % | 0 | 0 | 0 | 0 | 5.0 |
| Raisin pieces, wt % | 0 | 0 | 0 | 0 | 5.0 |
| Cinnamon, wt % | 0 | 0 | 0 | 0 | 0.1 |
| Total dry particulate ingredients, wt % | 86.2 | 86.2 | 86.5 | 86.1 | 85.2 |
| 5 wt % aqueous potato starch solution, wt % | 13.8 | 13.8 | 13.5 | 13.9 | 14.8 |
| Drying time, minutes | 15 | 15 | 15 | 15 | 15 |
| Drying temperature, ° C. | 125 | 110 | 125 | 125 | 125 |
| Wt % potato starch in dry cereal bar | 0.70 | 0.70 | 0.67 | 0.69 | 0.74 |

Example 2

Cereal bars comprising dry particulate ingredients in the proportions set forth in Example 1 were made with a 28 wt % aqueous whey protein solution as the binder. The proportions of dry particulate ingredients and binder solution were as set forth in the following table:

TABLE 2

| | Cereal bar type | | | | |
|---|---|---|---|---|---|
| | Fruit | Cranberry | Nut | Fruit and Nut | Apple Raisin |
| Granola | 62.8 | 62.8 | 61.2 | 59.1 | 60.8 |
| Whole grain rolled oats | 16.5 | 16.5 | 16.1 | 15.6 | 16.0 |
| Crisp Rice Extrusion, wt % | 3.3 | 3.3 | 3.2 | 3.2 | 3.2 |
| Dried raspberry pieces, wt % | 3.9 | 0 | 0 | 0 | 0 |
| Dried strawberry pieces, wt % | 3.9 | 0 | 0 | 0 | 0 |
| Strawberry flavor, wt % | 0.3 | 0 | 0 | 0 | 0 |
| Dried cranberry pieces, wt % | 0 | 7.8 | 0 | 0 | 0 |

TABLE 2-continued

| | Cereal bar type | | | | |
|---|---|---|---|---|---|
| | Fruit | Cranberry | Nut | Fruit and Nut | Apple Raisin |
| Cranberry flavor, wt % | 0 | 0.3 | 0 | 0 | 0 |
| Pecan (⅛) pieces, wt % | 0 | 0 | 4.9 | 7.4 | 0 |
| Hazelnut (½) pieces, wt % | 0 | 0 | 4.9 | 0 | 0 |
| Hazelnut flavor, wt % | 0 | 0 | 0.3 | 0 | 0 |
| Dried white fruit pieces, wt % | 0 | 0 | 0 | 5.2 | 0 |
| Pecan flavor, wt % | 0 | 0 | 0 | 0.3 | 0 |
| Dried apple pieces, wt % | 0 | 0 | 0 | 0 | 5.3 |
| Raisin pieces, wt % | 0 | 0 | 0 | 0 | 5.3 |
| Cinnamon, wt % | 0 | 0 | 0 | 0 | 0.1 |
| Total dry particulate ingredients, wt % | 90.7 | 90.7 | 90.7 | 90.7 | 90.7 |
| 28 wt % aqueous whey protein solution, wt % | 9.3 | 9.3 | 9.3 | 9.3 | 9.3 |
| Drying time, minutes | 15 | 15 | 15 | 15 | 15 |
| Drying temperature, ° C. | 125 | 110 | 125 | 125 | 125 |
| Wt % whey protein in dry cereal bar | 2.6 | 2.6 | 2.6 | 2.6 | 2.6 |

The ingredients were processed as set forth in Example 1. The resultant cereal bars had desired taste and were dry, grainy, natural appearance, and like granola in texture.

Example 3

Cereal bars comprising dry particulate ingredients and a fluid component comprising low DE glucose syrup in the proportions set forth in the following table were mixed to form a mixture.

TABLE 3

| | Cereal bar type | | | | |
|---|---|---|---|---|---|
| | Fruit | Cranberry | Nut | Fruit and Nut | Apple Raisin |
| Granola | 57.5 | 57.5 | 56.0 | 54.1 | 55.6 |
| Whole grain rolled oats | 15.1 | 15.1 | 14.8 | 14.3 | 14.6 |
| Crisp Rice Extrusion, wt % | 3.0 | 3.0 | 3.0 | 2.9 | 2.9 |
| Dried raspberry pieces, wt % | 3.6 | 0 | 0 | 0 | 0 |
| Dried strawberry pieces, wt % | 3.6 | 0 | 0 | 0 | 0 |
| Strawberry flavor, wt % | 0.3 | 0 | 0 | 0 | 0 |
| Dried cranberry pieces, wt % | 0 | 7.1 | 0 | 0 | 0 |
| Cranberry flavor, wt % | 0 | 0.3 | 0 | 0 | 0 |
| Pecan (⅛) pieces, wt % | 0 | 0 | 4.5 | 6.7 | 0 |
| Hazelnut (½) pieces, wt % | 0 | 0 | 4.5 | 0 | 0 |
| Hazelnut flavor, wt % | 0 | 0 | 0.3 | 0 | 0 |
| Dried white fruit pieces, wt % | 0 | 0 | 0 | 4.7 | 0 |
| Pecan flavor, wt % | 0 | 0 | 0 | 0.3 | 0 |
| Dried apple pieces, wt % | 0 | 0 | 0 | 0 | 4.9 |
| Raisin pieces, wt % | 0 | 0 | 0 | 0 | 4.9 |
| Cinnamon, wt % | 0 | 0 | 0 | 0 | 0.1 |
| Total dry particulate ingredients, wt % | 83.0 | 83.0 | 83.0 | 83.0 | 83.0 |
| Aqueous polysaccharose solution, wt % | 17.0 | 17.0 | 17.0 | 17.0 | 17.0 |
| Drying time, minutes | 15 | 15 | 15 | 15 | 15 |
| Drying temperature, ° C. | 125 | 110 | 125 | 125 | 125 |
| Wt % oligofructose syrup in dry cereal bar | 5.4 | 5.4 | 5.4 | 5.4 | 5.4 |
| Wt % glucose syrup (28 DE) in dry cereal bar | 5.2 | 5.2 | 5.2 | 5.2 | 5.2 |

The aqueous polysaccharose solution comprised 42.5 wt % oligofructose syrup (25 percent moisture), 42.5 wt % glucose syrup (DE 28, 28 percent moisture), and 5 wt % water. The aqueous syrup comprised 27.5 percent water.

These ingredients were processed as set forth in Example 1. The resultant bars were low-sugar bars having desired, less-sweet taste and were dry, grainy, and natural in appearance, and granola-like in texture.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

The invention claimed is:

1. A dried cereal bar comprising dry cereal ingredients and a binder that is selected from the group consisting of potato starch, whey protein, and blends thereof,
    wherein the dried cereal bar has a crunchy texture, and
    wherein the crunchy texture extends throughout the cereal bar and the crunchy texture is produced by drying the cereal bar at a temperature between about 110° C. and about 150° C. for from about 10 to about 60 minutes.

2. The cereal bar of claim 1, wherein the binder comprises purified native potato starch at from about 0.5 and about 1.5 weight percent, based on the weight of the dried cereal bar.

3. The cereal bar of claim 1, wherein the binder comprises whey protein at from about 2 and about 3 weight percent, based on the weight of the dried cereal bar.

4. The cereal bar of claim 1, wherein the binder further comprises glucose syrup having a DE in the range of between about 25 and about 50, at from about 8 and about 15 weight percent, based on the weight of the dried cereal bar.

5. The cereal bar of claim 4, wherein the DE of the glucose syrup is between about 25 and about 30.

6. The cereal bar of claim 1, wherein the binder is added as an aqueous solution and the weight ratio of dry ingredients to binder solution is between about 95:5 and about 75:25.

7. A method for manufacturing a dried cereal bar having a crunchy texture, said method comprising preparing a mixture of dry cereal ingredients selected from the group consisting of cereals, grains, inclusions, and blends thereof, and an aqueous solution comprising binder selected from the group consisting of potato starch, whey protein, and blends thereof, mixing the mixture of dry cereal ingredients with the aqueous binder solution, forming a sheet having a desired thickness, and forming pieces of desired size and shape before or after heating the sheet to a temperature between about 110° C. and about 150° C. for a time sufficient to dry the bar and yield a dry, crunchy, cereal bar; and wherein the crunchy texture extends throughout the cereal bar.

8. The method of claim 7, wherein the drying time is between about 10 and about 60 minutes.

9. The method of claim 7 wherein the aqueous solution of binder comprising potato starch has a starch concentration of between about 4 and about 10 wt percent.

10. The method of claim 7 wherein the aqueous solution of binder comprising whey protein has a whey protein concentration of between about 20 and about 30 wt percent.

11. The method of claim 7 wherein the aqueous solution of binder further comprises a glucose syrup having a DE in the range of between about 25 and about 50, with a polysaccharide concentration of between about 60 and about 80 wt percent.

12. The method of claim 9, wherein the weight ratio of dry ingredients to binder solution is between about 95:5 and about 75:25.

13. The method of claim 10, wherein the weight ratio of dry ingredients to binder solution is between about 95:5 and about 75:25.

14. The method of claim 11, wherein the weight ratio of dry ingredients to binder solution is between about 95:5 and about 75:25.

15. A dried cereal bar comprising dry cereal ingredients and a binder that is neither sweet nor sticky when dried, wherein the binder is selected from the groups consisting of potato starch, whey protein, and blends thereof, and wherein the dried cereal bar has a crunchy texture; and wherein the crunchy texture extends throughout the cereal bar and the crunchy texture is produced by drying the cereal bar at a temperature between about 110° C. and about 150° C. for from about 10 to about 60 minutes.

16. The cereal bar of claim 15, wherein the potato starch in the binder comprises purified native potato starch at from about 0.5 and about 1.5 weight percent, based on the weight of the dried cereal bar.

17. The cereal bar of claim 15, wherein the whey protein in the binder comprises whey protein at from about 2 and about 3 weight percent, based on the weight of the dried cereal bar.

18. The cereal bar of claim 15, wherein the binder further comprises one or more polysaccharides consisting of glucose syrups having a DE in the range of between about 25 and about 50, at from about 8 and about 15 weight percent, based on the weight of the dried cereal bar.

19. The cereal bar of claim 18, wherein the DE of the glucose syrup is between about 25 and about 30.

20. The cereal bar of claim 15, wherein the binder is added as an aqueous solution and the weight ratio of dry ingredients to binder solution is between about 95:5 and about 75:25.

21. A method for manufacturing a cereal bar having a crunchy texture, said method comprising preparing a mixture of dry cereal ingredients selected from the group consisting of cereals, grains, inclusions, and blends thereof, and an aqueous solution comprising binder that is neither sweet nor sticky when dried, wherein the binder is selected from the group consisting of potato starch, whey protein, and blends thereof, mixing the mixture of dry cereal ingredients with the aqueous binder solution, forming a sheet having a desired thickness, and forming pieces of desired size and shape before or after heating the sheet to a temperature between about 110° C. and about 150° C. for a time sufficient to dry the bar and yield a dry, crunchy, cereal bar; and wherein the crunchy texture extends throughout the cereal bar.

22. The method of claim 21, wherein the drying time is between about 10 and about 60 minutes.

23. The method of claim 21, wherein the aqueous solution of binder comprising potato starch has a starch concentration of between about 4 and about 10 wt percent.

24. The method of claim 21, wherein the aqueous solution of binder comprising whey protein has a whey protein concentration of between about 20 and about 30 wt percent.

25. The method of claim 21, wherein the aqueous solution of binder further comprises one or more polysaccharides selected from the group consisting of DE glucose syrup having a DE in the range of between about 25 and about 50, with a polysaccharide concentration of between about 60 and about 80 wt percent.

26. The method of claim 21, wherein the weight ratio of dry ingredients to binder solution is between about 95:5 and about 75:25.

27. The method of claim 24, wherein the weight ratio of dry ingredients to binder solution is between about 95:5 and about 75:25.

28. The method of claim 25, wherein the weight ratio of dry ingredients to binder solution is between about 95:5 and about 75:25.

* * * * *